G. H. WHITE.
COMPUTING SQUARE.
APPLICATION FILED MAY 9, 1917.
1,288,331.
Patented Dec. 17, 1918.
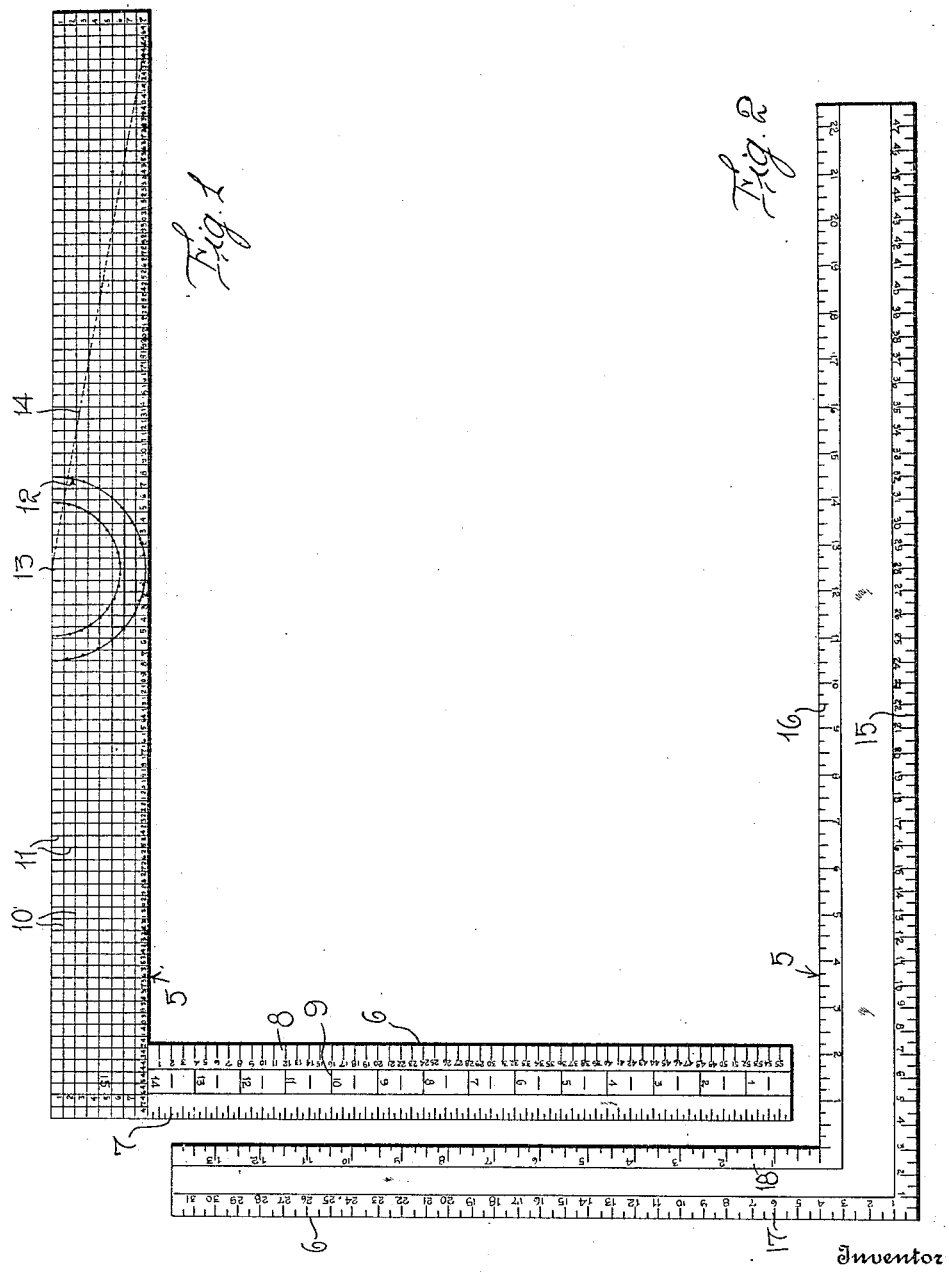
Inventor
GEORGE H. WHITE
By Watson E. Coleman
Attorney

UNITED STATES PATENT OFFICE.

GEORGE H. WHITE, OF GREELEY, COLORADO.

COMPUTING-SQUARE.

1,288,331.　　　　Specification of Letters Patent.　　Patented Dec. 17, 1918.

Application filed May 9, 1917. Serial No. 167,518.

*To all whom it may concern:*

Be it known that I, GEORGE H. WHITE, a citizen of the United States, residing at Greeley, in the county of Weld and State of Colorado, have invented certain new and useful Improvements in Computing-Squares, of which the following is a specification, reference being had to the accompanying drawings.

This invention relates to computing squares and has for its primary object to provide a carpenter's square which is provided with means whereby the length and degree of the miter cuts for the ends of roof rafters may be readily ascertained.

It is a more particular object of my invention to provide a square of the above character having a blade and a tongue at one end of the blade suitably graduated, said blade on one face being graduated to indicate foot lengths and fractional parts thereof and having a protractor or graduated degree scale centrally located upon said graduated face.

It is a further general object of the invention to provide a computing square for the above purpose, which is exceedingly simple in its construction, highly serviceable and convenient in practical use, and may be manufactured at relatively small cost.

With the above and other objects in view, my invention consists in the novel features of construction, combination and arrangement of parts to be hereinafter more fully described, claimed and illustrated in the accompanying drawing, in which, Figure 1 is a plan view of my improved computing square; and Fig. 2 is a similar view showing the opposite side face of the square.

Referring in detail to the drawing, 5 designates the main square blade and 6 the tongue which is relatively narrow and extends at right angles to the blade 5 from one end thereof. This square may be made of steel, or any other desired material, and the tongue 6 is provided with linear scales 7 and 8 respectively, along its inner and outer edges on one face, and also with a central linear scale 9. The outer scale 7 is graduated to fractional parts of an inch, while the central scale 9 has its graduations spaced apart one inch. The inner scale 8 has its graduations spaced apart one-quarter of an inch, each quarter inch representing one linear foot, and being sub-divided into twelve equal parts representing inches. These scales may be conveniently used in laying out various measurements upon the work.

The square blade 5 is provided upon one face with longitudinal score lines or graduations 10 spaced one-quarter inch apart, and the space between such lines being sub-divided into twelve equal parts. For the purpose of enabling the drawing to be clearly read, these minor divisions of the scale have been omitted. The face of the blade is also divided from end to end by graduation lines 11 which intersect the lines 10, the graduation lines 11 being likewise spaced one-quarter inch apart and the space between the same sub-divided to indicate fractional parts of a foot.

A protractor or degree scale, indicated at 12, is centrally provided upon the face of the blade 5 and is graduated into whole and half degrees. In ascertaining the necessary angles or miter cuts for the ends of a rafter, a rule or straight edge is placed upon the blade 10 and in intersecting relation with the point 13. Assuming that the roof has a ten degree pitch, and that the entire width thereof is thirty-two feet, the edge of the rule is placed upon the ten degree graduation of the scale 12, and by reading upon the rule from the point 13 to the point where its edge intersects the sixteen foot graduation extending across the face of the blade, the exact length of the rafter may be ascertained. The rule is, of course, graduated into feet and fractional parts thereof in a similar manner to the square blade. As the point 13 indicates the center of the roof and for a roof having a total width of thirty-two feet and a ten degree pitch, the end cuts for the rafter may be laid off at the proper angles along the graduations 11 on the face of the blade which intersect the edge of the rule. In the drawing, I have indicated by the dotted line 14, the edge of the rule referred to in the operation just described. In this way, the exact length of roof rafters for any width of roof up to an angle of ninety-six feet, may be readily determined.

The opposite side face of the blade 5 is also provided with scales 15 and 16 on its outer and inner edges respectively, while the corresponding face of the tongue 6 has similar scales 17 and 18 on its outer and inner edges. These scales, as will be readily understood, are employed in the usual manner in measuring or laying off materials.

From the foregoing description, taken in connection with the accompanying drawing, the construction, manner of use and several advantages of my invention will be clearly and fully understood. The improved square enables the workman to easily and quickly ascertain the desired measurements without having to resort to involved computation. It will, of course, be understood that the square blade and tongue may be made of greater or less length as desired. The device is very simple in its construction, highly convenient and serviceable in practical use, and may be manufactured at relatively small cost.

While I have shown and described the preferred embodiment of the device, it is to be understood that the same is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

A carpenter's square having a blade provided with intersecting, longitudinal and transverse graduations thereon representing foot lengths, said transverse graduations being readable in each direction from the center of the inner edge of the blade and indicative of one-half of the roof width, and a degree scale on the center of the blade upon said graduated face, the rafter length being determined by a line extended from the center of said degree scale through the degree corresponding to the roof pitch, and the transverse graduation intersected by such line indicating the roof width, said latter point of intersection on the line of longitudinal graduations of the square blade indicating the rise of the roof.

In testimony whereof I hereunto affix my signature in the presence of two witnesses.

GEORGE H. WHITE.

Witnesses:
W. R. ADAMS,
GEORGE D. ADAMS.

Copies of this patent may be obtained for five cents each, by addressing the "Commissioner of Patents, Washington, D. C."